No. 897,663. PATENTED SEPT. 1, 1908.
E. T. ROBINSON.
CONVERTIBLE AUTOMOBILE BODY.
APPLICATION FILED SEPT. 27, 1907.
8 SHEETS—SHEET 1.
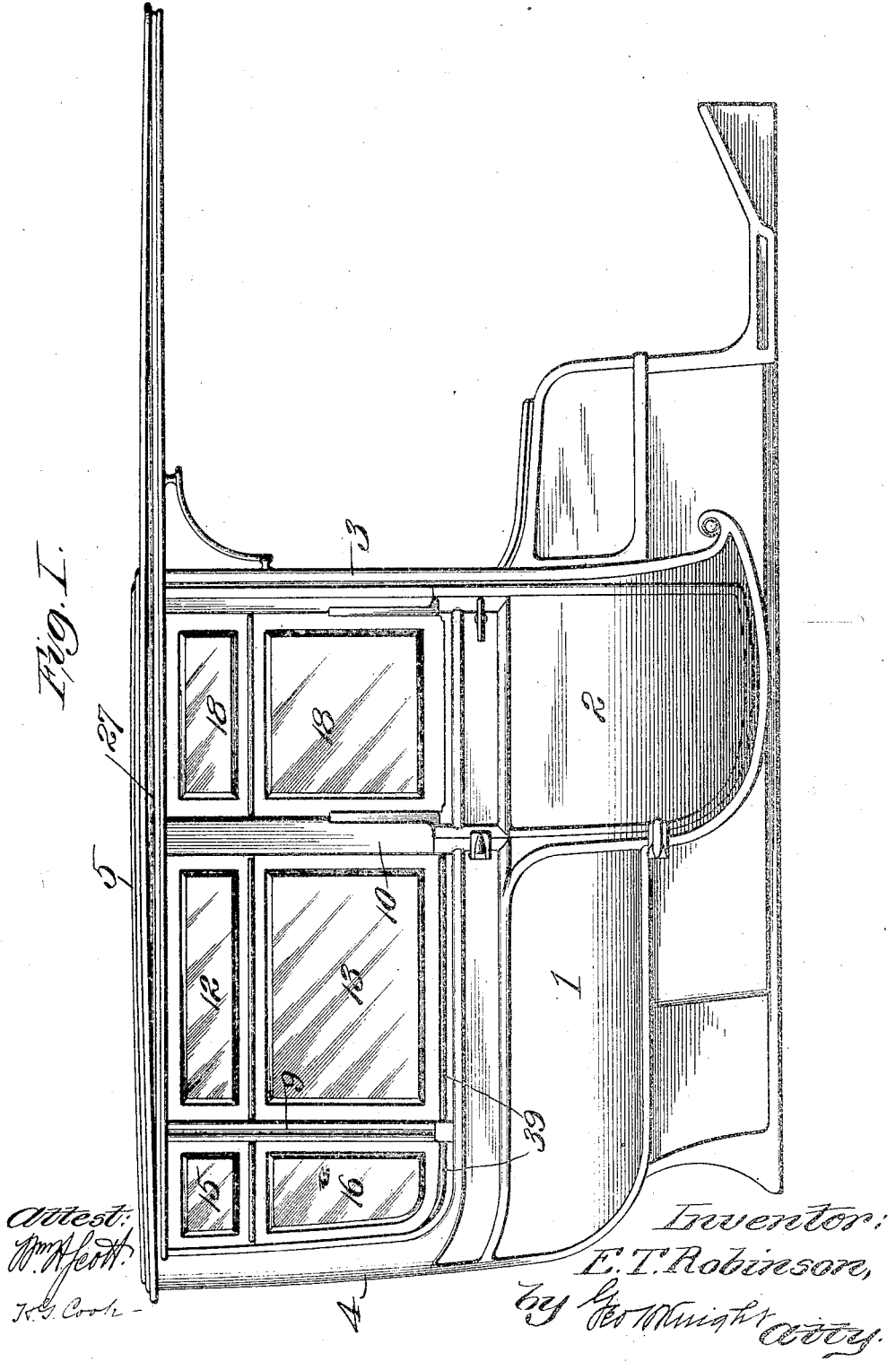

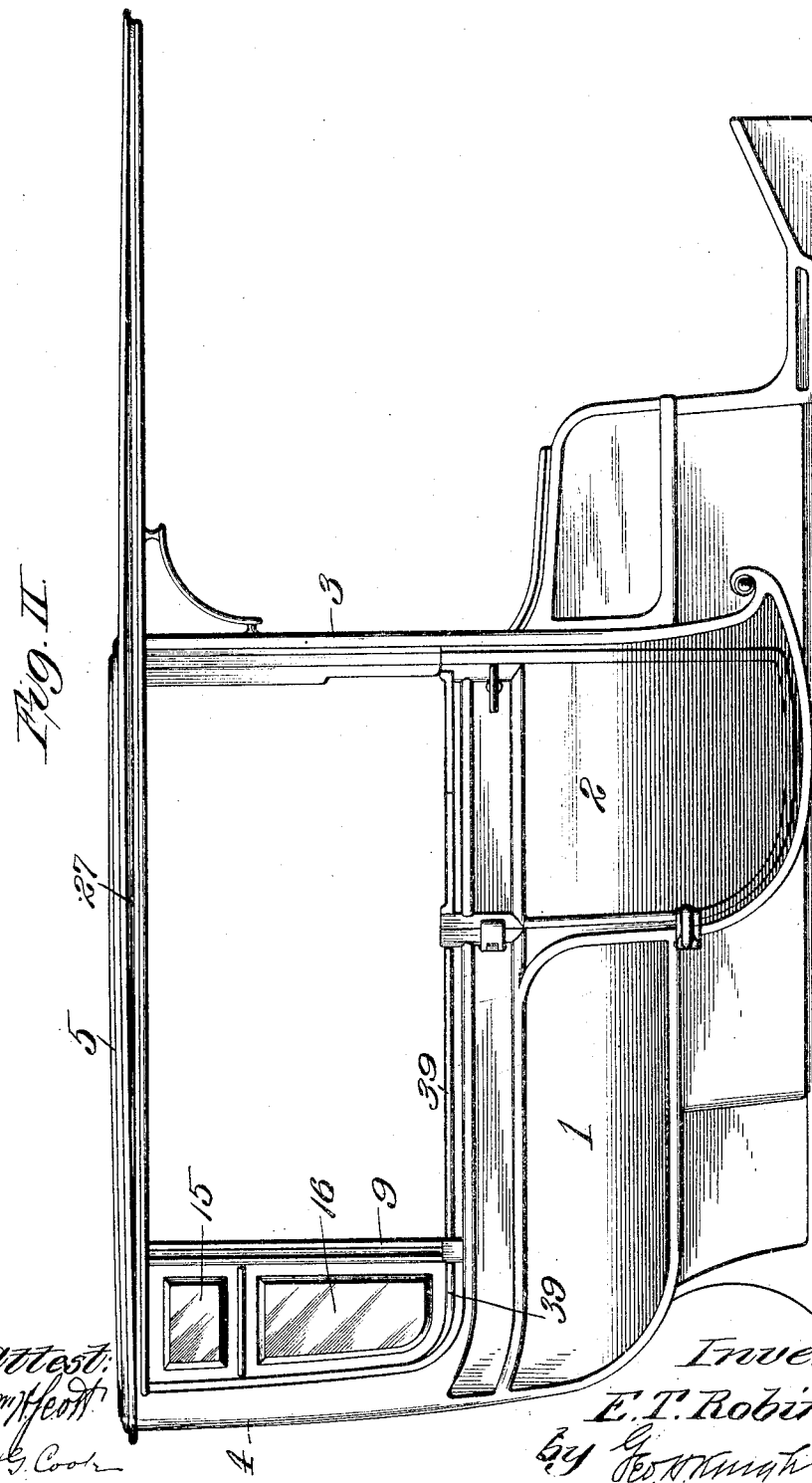

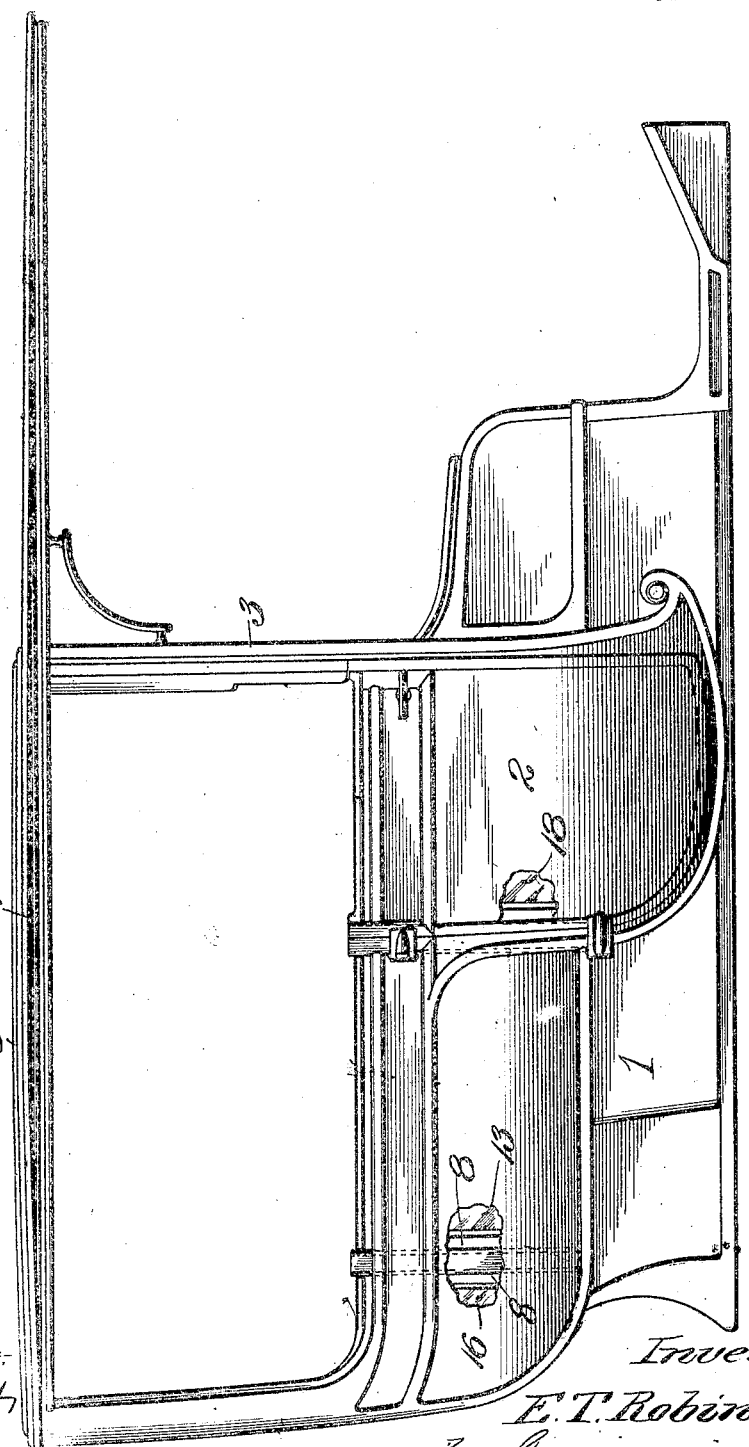

No. 897,663. PATENTED SEPT. 1, 1908.
E. T. ROBINSON.
CONVERTIBLE AUTOMOBILE BODY.
APPLICATION FILED SEPT. 27, 1907.
8 SHEETS—SHEET 4.
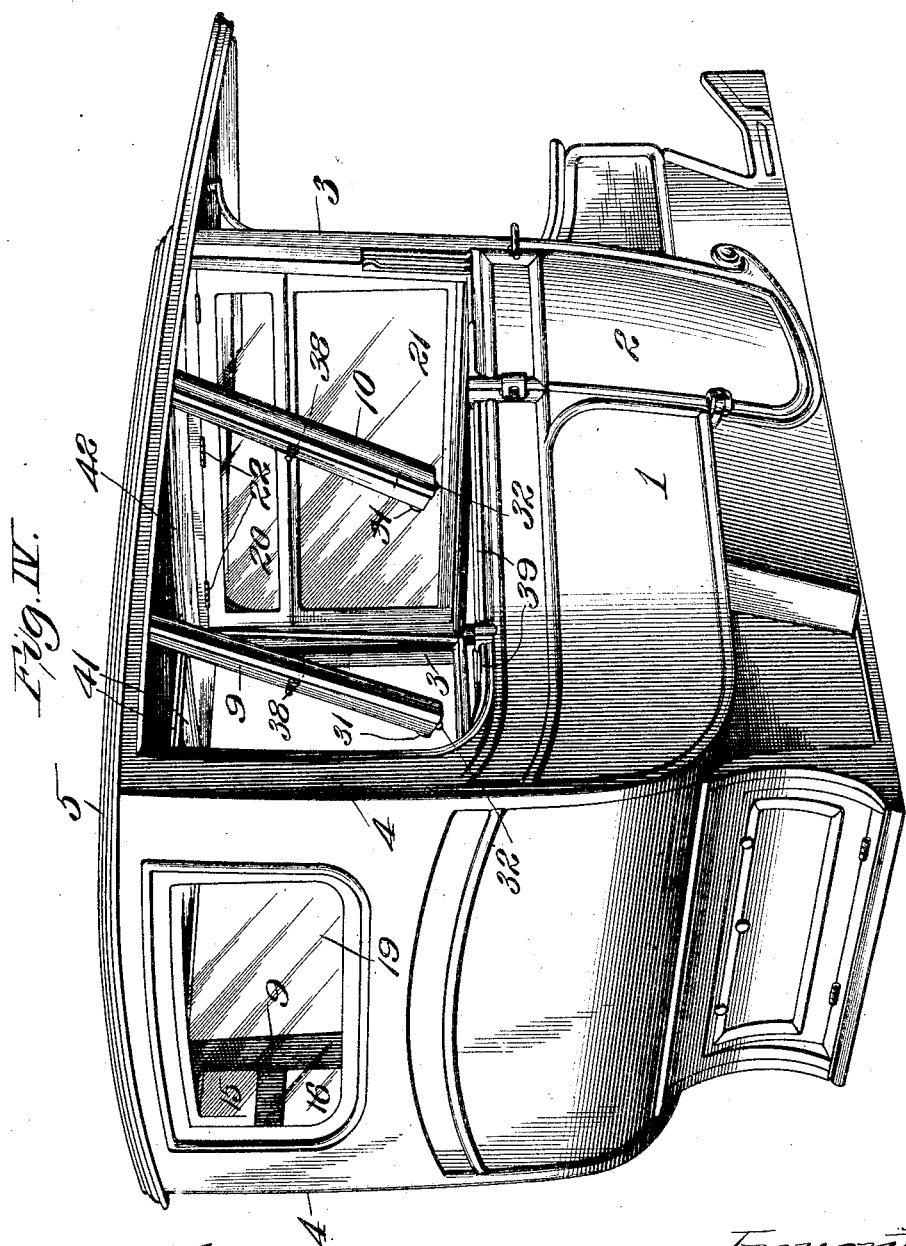

No. 897,663. PATENTED SEPT. 1, 1908.
E. T. ROBINSON.
CONVERTIBLE AUTOMOBILE BODY.
APPLICATION FILED SEPT. 27, 1907.
2 SHEETS—SHEET 5.
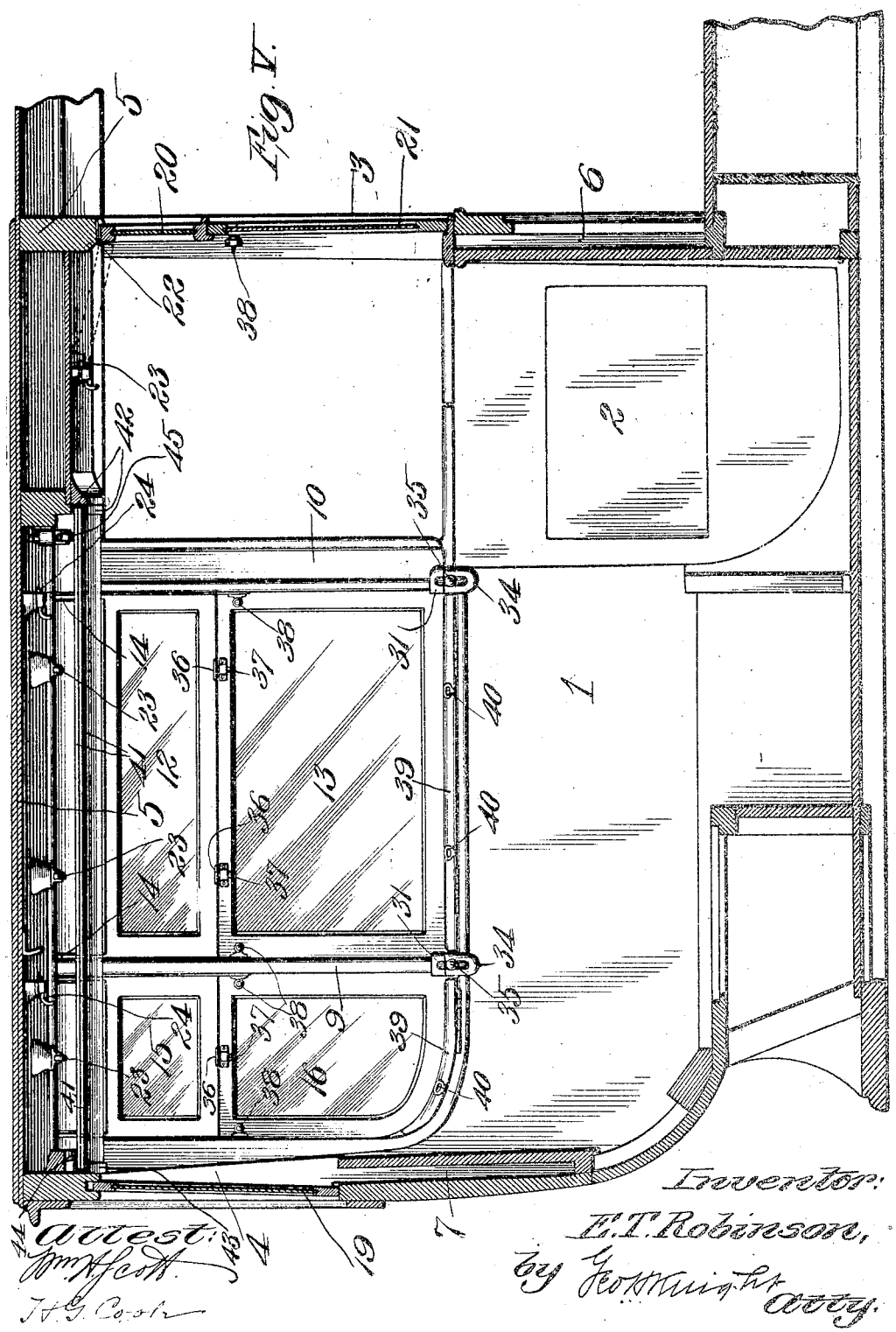
Inventor:
E. T. Robinson,
by Geo. Knight
atty.
Attest:

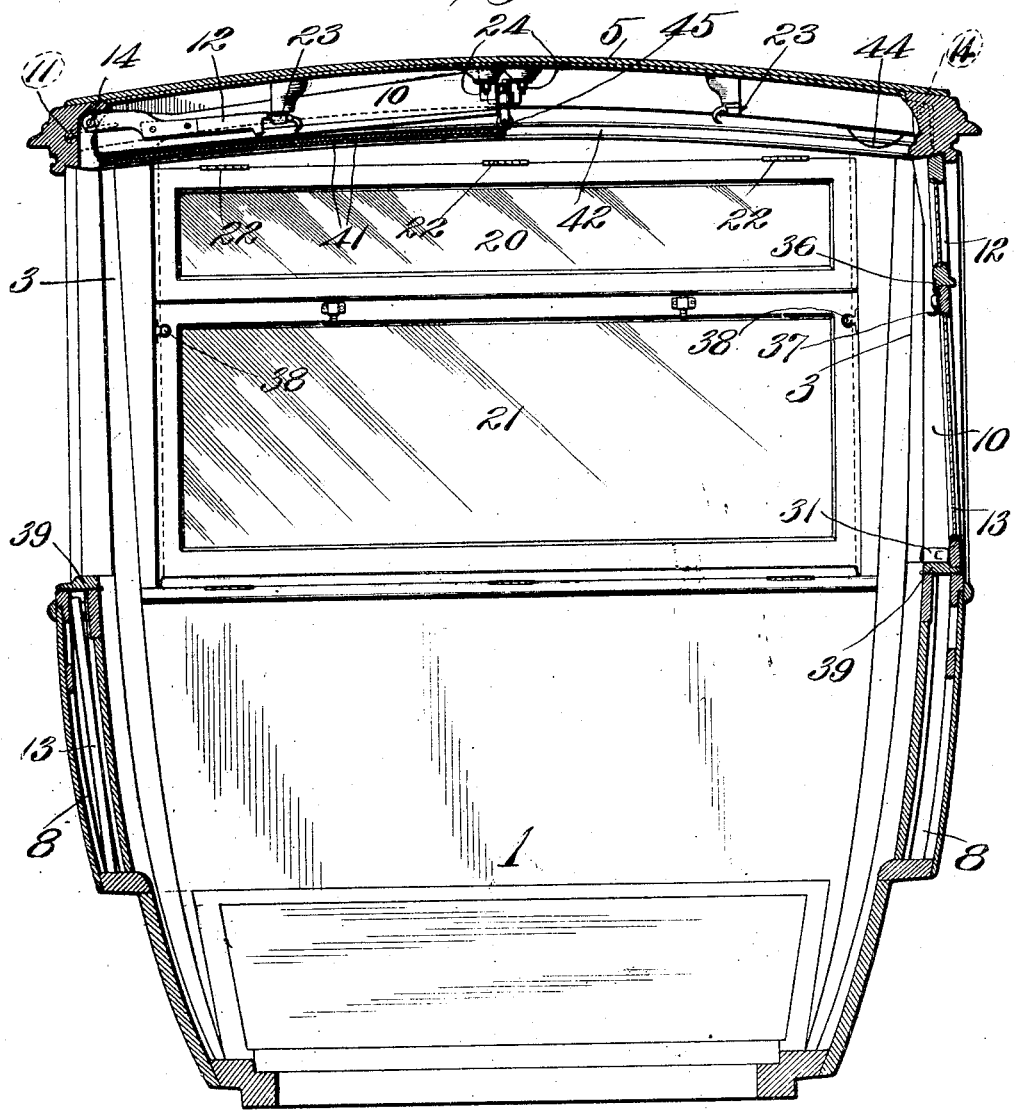

No. 897,663. PATENTED SEPT. 1, 1908.
E. T. ROBINSON.
CONVERTIBLE AUTOMOBILE BODY.
APPLICATION FILED SEPT. 27, 1907.
8 SHEETS—SHEET 7.
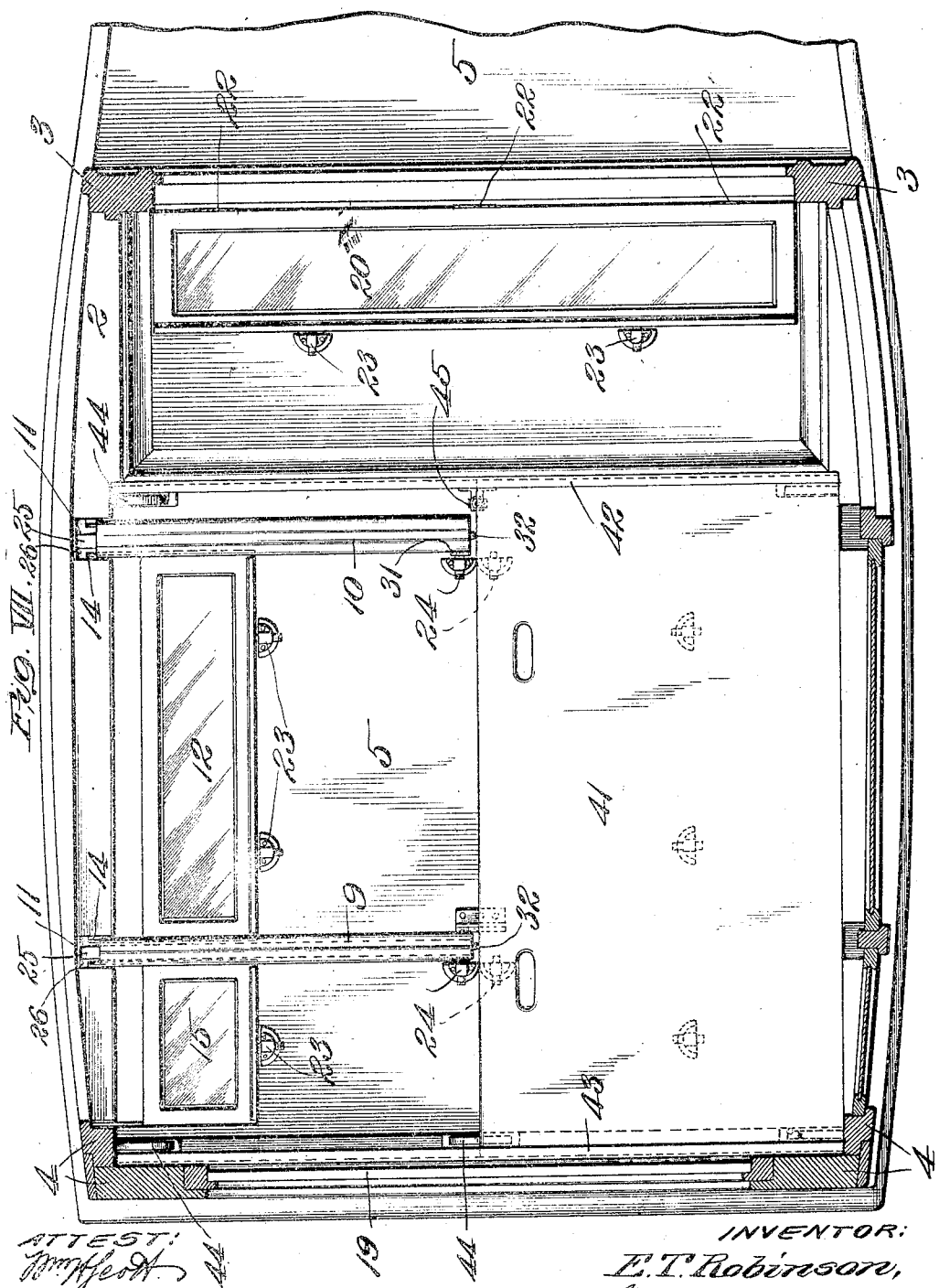
ATTEST:
INVENTOR:
E. T. Robinson,
BY Geo. H. Knight ATTY.

No. 897,663. PATENTED SEPT. 1, 1908.
E. T. ROBINSON.
CONVERTIBLE AUTOMOBILE BODY.
APPLICATION FILED SEPT. 27, 1907.
8 SHEETS—SHEET 8.
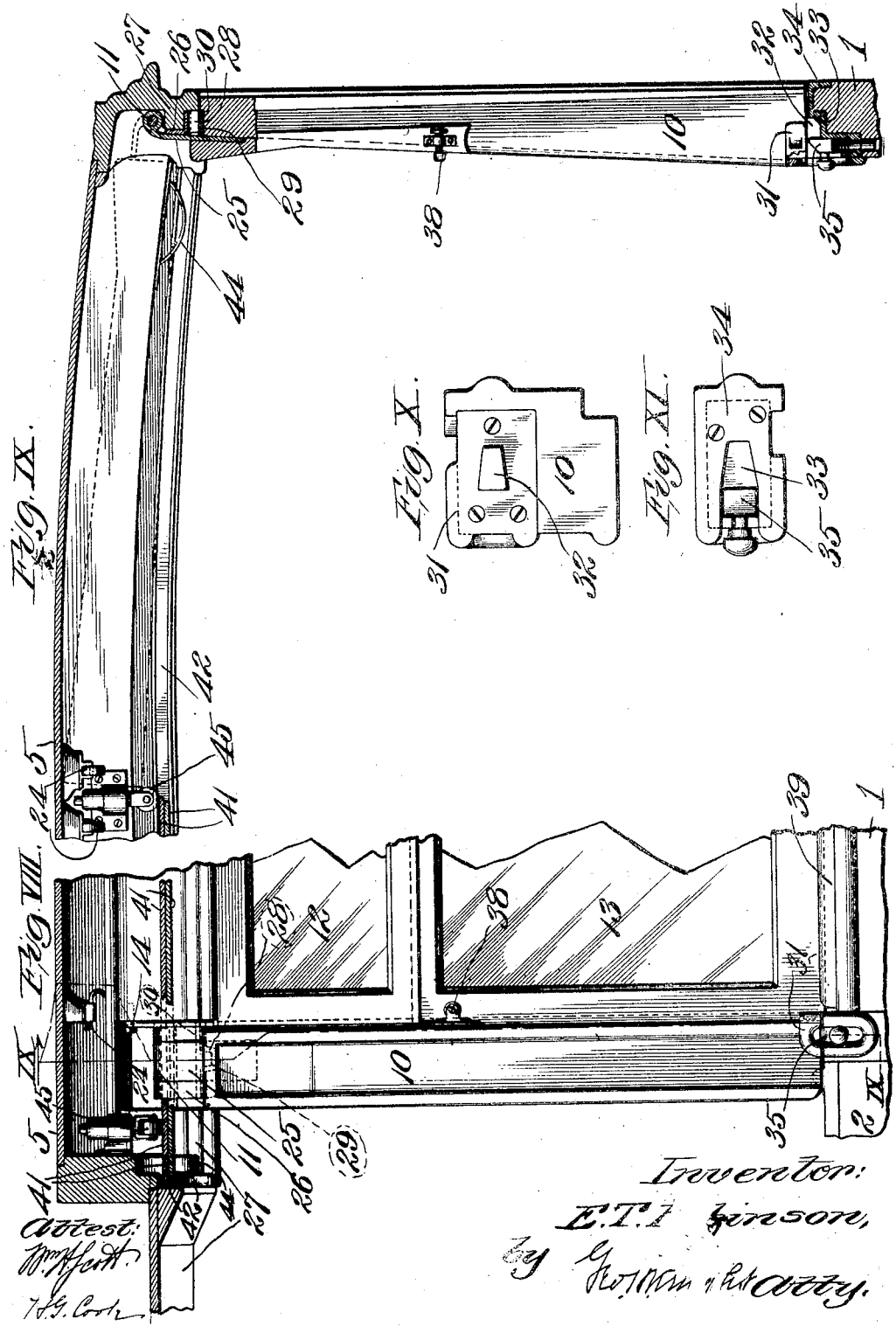

UNITED STATES PATENT OFFICE.

EDWARD T. ROBINSON, OF ST. LOUIS, MISSOURI, ASSIGNOR TO ST. LOUIS CAR COMPANY, OF ST. LOUIS, MISSOURI, A CORPORATION.

CONVERTIBLE AUTOMOBILE-BODY.

No. 897,663.     Specification of Letters Patent.     Patented Sept. 1, 1908.

Application filed September 27, 1907. Serial No. 394,823.

*To all whom it may concern:*

Be it known that I, EDWARD T. ROBINSON, a citizen of the United States of America, residing at the city of St. Louis, in the State of Missouri, have invented certain new and useful Improvements in Convertible Automobile-Bodies, of which the following is a full, clear, and exact description, reference being had to the accompanying drawings, forming part of this specification.

My invention relates to a new and useful improvement in convertible automobile bodies and has for its object to produce what is known as a limousine, demi-limousine or a completely open body with very little trouble, and in a very short space of time, by the occupant of the vehicle.

A further object of my invention is to so construct a body having the advantages just mentioned, that it will be sufficiently strong to withstand the severe usage to which said vehicles are sometimes subjected, and will be noiseless, or the parts will not rattle when adjusted to any of its various forms.

Figure I is a side elevation of the body adjusted to form a limousine. Fig. II is a side elevation of the body adjusted to form a demi-limousine. Fig. III is a side elevation of the body adjusted to form a completely open vehicle. Fig. IV is a perspective view of the body partly illustrating the manner of converting the vehicle from one shape to another. Fig. V is a vertical longitudinal section through the body. Fig. VI is a vertical transverse section through the body. Fig. VII is a horizontal section of the body looking toward the top. Fig. VIII is an enlarged detail section of a portion of the vehicle, one of the hinged posts, and a portion of the sashes employed in carrying out my invention. Fig. IX is an enlarged vertical transverse section taken on line IX—IX, Fig. VIII. Fig. X is an inverted plan view of one end of one of the hinged posts employed in carrying out my invention. Fig. XI is a top or plan view of one of the stationary posts with which the hinged post, illustrated in Fig. I, coöperates.

1 designates the lower portion of the body proper which is provided in its sides near its front with outwardly hinged doors 2, and extending upwardly from this body 1 are front and rear stationary corner posts 3, 3 and 4, 4, respectively, which corner posts support the top 5 of the vehicle. The body 1 is provided with a front, rear and pair of side pockets 6, 7 and 8 respectively and are designed to receive drop sashes to be hereinafter described. Each side of the body 1 is provided with intermediate side posts 9 and 10 hinged to the top 5 at 11 and between these posts are located upper and lower sashes 12 and 13, the former being hinged to the top 5 at 14 and the latter having slidable contact therewith in such manner that upon proper manipulation thereof, it can be lowered into its respective pocket 8.

Located between each of the rear stationary corner posts 4 and the hinged side posts 9 are arranged upper and lower sashes 15 and 16, the former being hinged to the top 5, in similar manner as is the sash 12, and the latter having slidable contact with the said posts 4 and 9, in like manner as is the sash 13, whereby, upon the proper manipulation of said sash 16, it can be lowered into a pocket formed in the side of the body 1.

18 designates a slidable sash which operates between each of the stationary front corner posts 3 and each of the hinged side posts 10, and is arranged, when in its raised position, directly above the hinged door 2 of the body, which door 2 is provided with a pocket designed to receive it when said sash is lowered. The rear end of the vehicle body is provided with a slidable sash 19 operating between the stationary rear corner posts 4, 4 and is designed, when lowered, to be received by the pocket 7 of the body 1. The front end of the vehicle body is provided with upper and lower sashes 20 and 21 operating between the stationary front corner posts 3, the former sash being hinged at 22 to the top 5 while the latter is slidable and is designed to be received, when lowered, by the pocket 6 formed in the body 1.

23 designates a plurality of spring actuated catches secured to the under face of the top 5 of the vehicle body, there being one or more of these spring actuated catches for coöperation with each of the hinged sashes 12, 15 and 20, their function being to retain said sashes in an elevated or open position when the same are so adjusted.

24 designates a plurality of spring actuated catches, similar in construction to the catches 23, secured to the under face of the top 5 of the vehicle body for coöperation with the free ends of the hinged side posts 9 and 10, and are designed to retain said posts in a raised position when said posts are so adjusted. These hinged posts 9 and 10 being practically of the same construction, I will confine the following description to but one of them, and call particular attention to Figs. VIII to X inclusive of the drawings.

The hinge post 10 is provided with a hinge member 25 secured thereto, which coöperates with a hinge member 26 mounted upon a longitudinal side top rail 27 of the vehicle body. The hinge member 26 is provided with a projection or dowel 28 which is designed to be received by a recess 29 formed in a plate 30 secured to the top of the post 10 when the post is in a vertical position. The lower or free end of the hinged post 10 is provided with a, preferably metallic, plate 31 having a projection or dowel 32, which is designed to be received by a recess 33 formed in a metallic body 34 located directly beneath the post 10, said dowel being retained in said recess by a spring actuated catch 35 as is clearly illustrated in Fig. IX of the drawings. These dowels 28 and 32 manifestly materially brace the post 10 and prevent the same from having independent movement relative to its supports, thus insuring against rattling, at the same time relieve the hinge proper of unnecessary strain and maintain the post 10 in such true alinement that the sashes which coöperate therewith will have free movement. Each of the hinged sashes is provided upon its free edge with a plate 36 having a suitable opening or slot formed therein, and each slidable sash, with the exception of the door sashes and the rear sash, is provided with a spring actuated catch 37 located upon its top rail, which is designed to coöperate with the plate 36 for the purpose of holding said hinged sashes tightly against said slidable sashes, see Fig. V.

38 designates screw buttons mounted upon all the upright posts, both stationary and hinged, and are designed to be adjusted in such manner that they will coöperate with the stiles of the slidable windows to hold the same tightly in place against their respective posts.

I have caused the plates 36 of the hinged sashes and the spring catches secured to the top 5 of the vehicle to be in vertical alinement with each other and have located the latter in such position that, when the hinged sashes are raised to their uppermost positions, said plates 36 will coöperate with said spring catches, whereby it will be seen that the plates 36 perform the dual function of retaining said hinged sashes in either their open or closed positions.

39 designates hinged covers for the window pockets which also serve for supports for the slidable sashes when the latter are in a raised position, said covers being preferably provided with spring catches 40 for holding said covers in their closed positions.

When it is desired to convert the vehicle from, say a completely closed condition to a comparatively open condition, I first release the hinged sashes by properly manipulating the spring catches 37, and swinging the same upwardly until they engage and become retained by the spring catches. I then unclamp or partly withdraw the screw buttons 38, raise the slidable sashes a sufficient distance to permit the pocket covers 39 to be swung out of the downward path of movement of the slidable sashes, then lower said slidable sashes into their respective pockets and then restore the pocket cover to their original position. I then release the free ends of the posts 9 and 10, by properly manipulating their locks or spring catches, and swing them inwardly and upwardly until they engage and become retained by the spring catches secured to the top 5 and the conversion is then complete.

It is desirable to have all of the hinged sashes and posts which fold upwardly into the top of the vehicle as well as all of the catches, etc., hidden from view in order to produce a more pleasing effect upon the eye and with this end in view I have formed a covering for the parts in the shape of what I might term a false ceiling. This false ceiling is composed of two slidable panels 41 which are movable, preferably transversely of the vehicle, in and are supported by suitable channels 42 and 43, said panels being of equal lengths and of a thickness which will permit one to rest and slide directly above the other within their supporting and guiding channels 42 and 43, whereby both panels can be slid to one side of the vehicle, while the opposite side of the same is being converted, then both panels can be moved to the opposite side of the vehicle while the other side is being converted and then one panel only can be slid to cover the entire top. In order to prevent rattling and dislodgment, from their desired places, of the panels, I have arranged a plurality of leaf springs 44 on the top 5 which are designed to exert pressure upon the panels and produce the desired effect. In order to further insure these panels against accidental displacement I employ a spring actuated roller 45 mounted upon the top 5 of the vehicle.

I claim:—

1. A convertible automobile body consisting of a body proper, stationary corner posts extending upwardly therefrom, a top supported by said corner posts, side posts, hinged to said top and susceptible of being moved in juxtaposition to the top of the vehicle body, means for retaining said hinged posts in either their elevated or lowered position, and window sashes for coöperating with said stationary corner posts and said hinged posts, substantially as set forth.

2. A convertible automobile body consisting of a body proper, stationary corner posts extending upwardly therefrom, a top supported by said corner posts, hinged side posts, hinged window sashes, said hinged posts and said hinged window sashes being susceptible of being moved in juxtaposition to said top, and means for retaining said hinged posts and said hinged sashes in either their elevated or lowered position, substantially as set forth.

3. A convertible automobile body consisting of a body proper, stationary corner posts, a top, side posts hinged to said top, slidable window sashes, means for retaining said hinged side posts in either their raised or lowered position, and means for retaining said window sashes in either their raised or lowered position; said body proper being provided with pockets for the reception of said slidable window sashes substantially as set forth.

4. A convertible automobile body consisting of a body proper, stationary corner posts, a top, hinged side posts, hinged window sashes; said hinged posts and hinged window sashes being susceptible of being raised in juxtaposition to said top, means for retaining said hinged elements in their raised or lowered positions, and a covering or false ceiling for the purpose specified, substantially as set forth.

5. A convertible automobile body having window sash pockets formed in its sides and end walls, stationary corner posts extending upwardly from said body, a top supported by said corner posts; said posts being hinged to said top, a dowel carried by each of said hinged posts for coöperation with plates supported by said body proper, means for locking said posts in their lowered position, hinged and slidable sashes located between said hinged posts and between said hinged and stationary corner posts; said hinged sashes being supported in the top proper of the vehicle and the slidable sashes being each located in vertical alinement with said pockets of the body proper, and means for locking said hinged sashes in either their raised or lowered positions, substantially as set forth.

6. A convertible automobile body having a window sash pocket, stationary corner posts, a hinged side post, and a hinged window sash and a slidable window sash located between one of said corner posts and said hinged post and arranged directly above the window sash pocket of the body, substantially as set forth.

7. A convertible automobile body having a window sash pocket, stationary corner posts, a hinged side post, a hinged window sash and a slidable window sash located between one of said corner posts and said hinged post and arranged directly above the window sash pocket of the body, means carried by the top of the vehicle for supporting the said hinged sash in its raised position, and means carried by said slidable sash for locking said hinged window sash in its lowered position, substantially as set forth.

8. A convertible automobile body consisting of a body proper having window sash pockets formed in its side and end walls, a hinged door located in the side wall of the body proper and having a window sash pocket arranged therein, stationary corner posts supported by said body proper, a top supported by said corner posts, hinged side posts supported by said top, means for locking said hinged side posts in either their elevated or lowered position, hinged window sashes located between the corner posts and the hinged side posts and between the hinged side posts, slidable window sashes coöperating with said posts designed to be received by the sash pockets in the body proper, and a slidable window sash which coöperates between one stationary corner post and one hinged post which is susceptible of being lowered into the pocket formed in the hinged door, substantially as set forth.

9. A convertible automobile body consisting of a body proper, stationary corner posts, a top, hinged side posts, hinged window sashes, said hinged posts and said hinged window sashes being susceptible of being raised in juxtaposition to said top, means carried by said top for retaining said hinged posts and sashes in their elevated positions, a slidable ceiling for housing in said means and said hinged elements when the latter are in their elevated positions, and means for insuring said slidable ceiling against accidental displacement and against rattling, substantially as set forth.

10. In an automobile body, the combination with a body proper, of stationary corner posts, a top, hinged side posts and window sashes which are movable inwardly and upwardly under said top, means for retaining said hinged elements in their elevated positions, channels supported by the top, and stationary posts of the vehicle, and a pair of panels slidably mounted in said channels for forming a false ceiling of the vehicle for the purpose specified.

11. In an automobile body, the combination with a body proper, of stationary corner posts, a top, hinged side posts and window sashes which are movable inwardly and upwardly under said top, means for retaining said hinged elements in their elevated positions, channels supported by the top and stationary posts of the vehicle, a pair of panels slidably mounted in said channels for forming a false ceiling of the vehicle, and resilient means for coöperating with said panels to hold the same in any desired position, substantially as set forth.

12. In an automobile body, the combination with a body proper, of stationary corner posts, a top, hinged side posts and window sashes which are movable inwardly and upwardly under said top, means for retaining said hinged elements in their elevated positions, channels supported by the top and stationary posts of the vehicle, a pair of slidable panels mounted in said channels for forming a false ceiling, which panels are so constructed and arranged that one panel can occupy a position directly above its companion and that either or both panels can be slid independently or collectively for the purpose specified.

13. In an automobile body, the combination with a body proper, of stationary corner posts, a top, hinged side posts and window sashes which are movable inwardly and upwardly under said top, means for retaining said hinged elements in their elevated positions, channels supported by the top and stationary posts of the vehicle, a pair of slidable panels mounted in said channels for forming a false ceiling, which panels are so constructed and arranged that one panel can occupy a position directly above its companion and that either or both panels can be slid independently or collectively and resilient means for coöperating with said panels to hold the same in any desired position, substantially as set forth.

E. T. ROBINSON.

In presence of—
ARTHUR DIEKMANN,
HELEN J. MURPHY.